United States Patent [19]

Wilkinson

[11] 4,061,388
[45] Dec. 6, 1977

[54] SAFETY BECKET

[76] Inventor: Alvin H. Wilkinson, Rte. 1, Box 106, Talala, Okla. 74080

[21] Appl. No.: 767,806

[22] Filed: Feb. 11, 1977

[51] Int. Cl.² ............................................. B66C 1/36
[52] U.S. Cl. ............................... 294/82 R; 24/232 R; 24/241 P; 59/89
[58] Field of Search .................... 294/75, 78 R, 82 R, 294/84, 83 R, 83 A; 24/232, 233, 238, 241 R, 241 P, 241 PP, 241 SP; 59/85, 86, 88, 89, 93, 95

[56] References Cited

U.S. PATENT DOCUMENTS

| 1,297,300 | 3/1919 | Preisler | 294/84 |
| 1,379,133 | 5/1921 | Speece | 24/232 UX |
| 1,758,722 | 5/1930 | Symonds | 294/83 R |
| 2,605,130 | 7/1952 | Meighan | 294/75 |
| 3,428,355 | 2/1969 | Hamilton | 294/82 R |

Primary Examiner—Johnny D. Cherry
Attorney, Agent, or Firm—Head, Johnson & Chafin

[57] ABSTRACT

An improved hoisting hook or becket including an upper body member having an eye in the upper portion for receiving a cable, hook or the like for lifting the becket and any load attached to it, the body having spaced apart openings near the bottom edge, a lower U-shaped shank member having ends which are in a common plane and having openings near each of the ends, the openings in the shank and body being substantially equidistant and a pair of links each having parallel side plates and parallel horizontal upper and lower pins, the lower pins of each link being received in the openings in the shank and the upper pin of one of the hooks being received in the first opening in the body so that the shank is pivotal relative to the body, the second opening in the body having open communication through the top of the body member and providing means so that the upper pin of the second link can be slidably moved into and out of the second opening, the dimensions of the body, shank, hook and links being arranged such that there is normally a small space between the ends of the shank and the lower surface of the body and wherein the shank can be moved upwardly and laterally in the direction towards the body second opening. The second link can be swung out of engagement with the body to permit the shank to be opened. When a weight is placed on the hook the shank is moved downwardly relative to the body and in such position the second link cannot be disengaged from the body.

2 Claims, 4 Drawing Figures

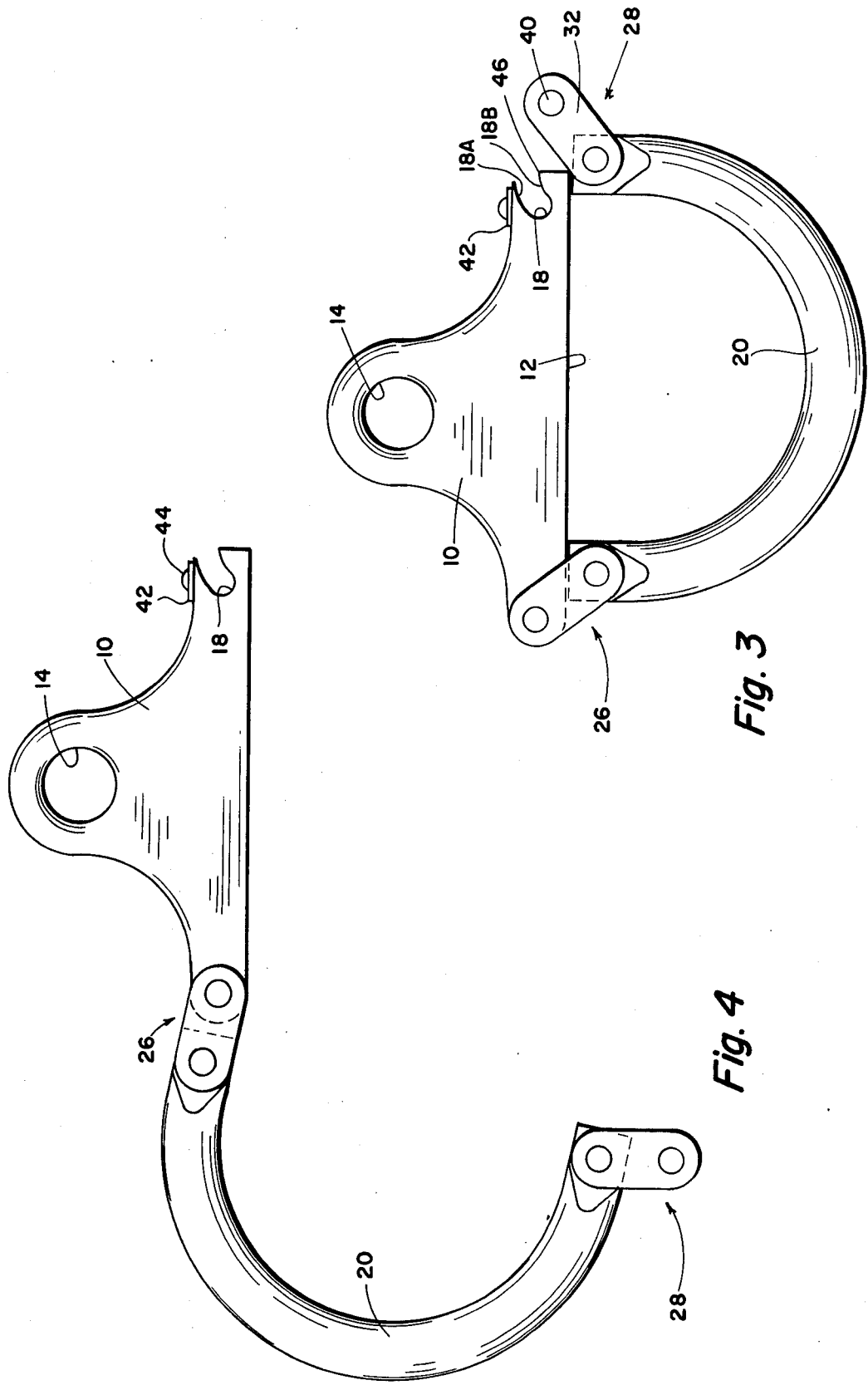

SAFETY BECKET

BACKGROUND OF THE INVENTION

This invention provides a safety hook or becket which is utilized with a hoisting mechanism to attach to and detach from loads. A typical hoist includes a boom having a pulley at the outer end with a cable extending over the pulley. At the lower end of the cable a hook or becket is provided to enable the cable to be attached to and detached from devices to be lifted. The element used to attach and detach from loads is usually referred to as a hoisting hook, safety hook, or becket. The word "hook" usually suggests a device having an eye for attaching a cable, a chain or the like and having a downwardly extending slot into which another cable, chain or the like may be received. The present invention is directed towards an apparatus which accomplishes the same purpose of the normally utilized hook but in an arrangement providing substantially increased safety. Therefore, the device performs the function of a hook but does not have the appearance of a hook and may better be described as a safety becket.

Others have provided safety hooks and becket devices for securing a cable or the like and as examples of known types of devices reference may be had to the following U.S. Pat. Nos.: 1,582,062, 2,027,376, 2,091,477, 2,622,846, 3,167,346, 3,428,355.

While the safety hooks and beckets such as illustrated in these prior issued patents perform satisfactorily, the present invention is directed towards an improved type of becket having increased safety, utility and economy of construction.

SUMMARY OF THE INVENTION

The improved becket of this invention includes two basic parts, that is, an upper body portion and a lower U-shaped shank portion. In addition, a pair of links are employed, each of the links having parallel vertical side plates and paralleled horizontal upper and lower pins. The body has an eye in the upper portion for receiving a cable, a hook or the like, for lifting the becket and any apparatus which is attached to and supported by it. The body has a lower surface and first and second openings spaced apart from each other and equally distant from the eye, the openings being above the bottom lower surface. One of the openings in the body being open to the top, that is, providing a recess in the body, the opening having sidewalls that extend upwardly relative to the body lower surface and outwardly in a direction away from the first body opening. The lower U-shaped shank member has a first and second end in a common plane with a first opening adjacent the first end and a second opening adjacent the second end, the spaces between the openings in the shank being substantially equal to the spacing between the openings in the body. A link lower pin is received in each of the shank openings. The upper pin of one of the links is received in the first body opening so that the shank member is pivotally supported to the body member, and the other link is pivotally supported to the second end of the shank.

When the shank member is moved upwardly so that the shank ends are contiguous to the body lower surface and the shank is displaced laterally in the direction towards the body second opening, the second link can be pivoted and the upper pin inserted downwardly into the body second opening. When weight is applied to the shank the second link is prevented from becoming dislodged from the body second opening. No possibility exists from the second link becoming inadvertently unhooked from the body since in order to be able to pivot the second link out of engagement with the body the shank must not only be moved upwardly towards the body, but shifted laterally, possibilities which cannot exist under load conditions.

To further insure the safety of the becket and to prevent the shank from becoming unhooked from the body portion even when no weight is applied to the shank, a leaf spring member is attached to the body above and parallel to the second opening to resiliently engage the top of the link when it is in position in the second opening.

OBJECTS OF THE INVENTION

The object of this invention is to provide an improved safety becket.

More particularly, an object of this invention is to provide a safety becket in the form of a body portion with an eye by which the becket may be attached to a cable or the like and a lower U-shaped shank hinged to the body portion by means of a link at one end, and the other being connectable by a link which can be slid into an open top opening in the body only when the shank is moved upwardly and laterally relative to the body, thereby providing a becket which is easily fully open but which cannot become inadvertently disconnected.

These general objects, as well as other and more specific objects of the invention will be fulfilled in the following description and claims, taken in conjunction with the attached drawings.

DESCRIPTION OF VIEWS

FIG. 3 is an elevational front view as shown in FIG. 1 but showing the second link pivoted out of engagement with the upper body member.

FIG. 4 is an elevational front view showing the shank portion in the fully opened position.

DETAILED DESCRIPTION

Figure 1:
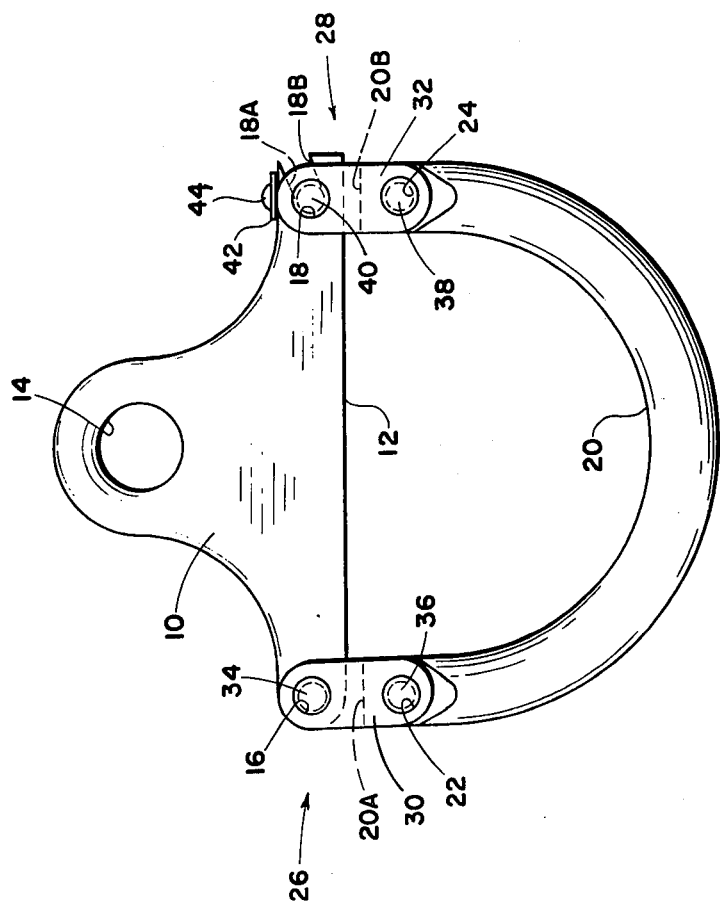
FIG. 1 is an elevational front view of a becket of this invention shown in the closed position.

Referring to the drawings and first to FIG. 1, the becket includes an upper body member 10, normally formed of steel. Body member 10 has a lower surface 12 which is preferably planar, at least in the areas adjacent the opposed ends of the body. The upper portion of the body member includes an eye 14 designed to receive a cable, chain or the like by which the becket is supported.

Formed in th body 10 adjacent to one end is a first opening 16, spaced above the lower surface 12. Formed in the opposite end of the body 10 is a second body opening 18. The opening 18 is open at the top. Walls 18A and 18B form an upward extension of the opening 18 with the walls tapering upwardly and laterally in the direction away from the first opening 16.

Figure 2:
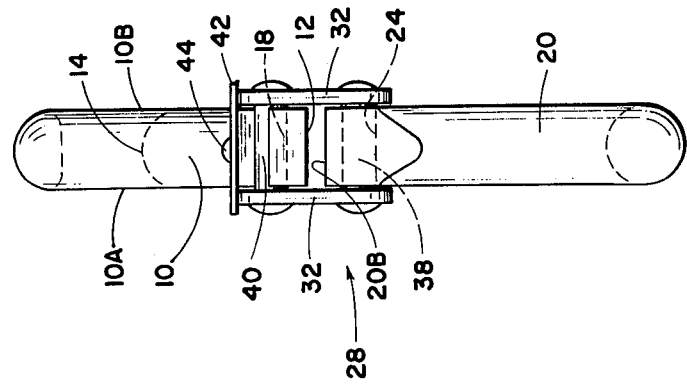
FIG. 2 is an elevational side view of the becket as shown in FIG. 1.

As shown in FIG. 2, the body member 10 is preferably of a construction having planar sides 10A and 10B. The body portion 10 can be formed of flat sheet steel or cast of wrought iron. Positioned below the body 10 is a lower U-shaped shank member 20, which has a first end 20A and a second end 20B, the ends being in a common plane. Formed in the shank adjacent the end 20A is a first shank opening 22 and formed adjacent the second end 20B is a second shank opening 24. Openings 22 and 24 are substantially the same distance apart as body openings 16 and 18.

A link 26 is formed of vertical side plates 30 and in a similar manner a link 28 is formed of vertical parallel side plates 32. Link 26 includes an upper pin 34 which extends through openings in the upper side plates 30 and through opening 16 in body 10. A lower pin 36 of link 26 extends through openings in the side plates 30 and through first opening 22 in shank 20. Pins 34 and 36 are pivotal relative to a body 10 and shank 20 respectively so that the shank 20 is pivotally connected to the body and may be swung in an open position as shown in FIG. 4. In this position a chain, cable, hook or any other apparatus which may be received in the space between the shank 20 and the lower surface 12 of the body 10 may be connected to the becket.

Link 28 includes a lower pin 38 by which the link is pivotally connected to the shank 20. This pivotal connection remains and stays with the shank when it is in the open position as shown in FIG. 4. The link 28 also includes an upper pin 40 which is slidably received in the body second opening 18.

Affixed to the body 10 above second opening 18 is a small rectangular leaf spring 42 held in place by a bolt or rivet 44. The leaf spring 42 resiliently engages the upper end of the side plates 32 of link 28 so as to resiliently retain pin 40 in opening 18.

FIGS. 1 and 2 show the position of the elements making up the becket when it is used under load with a cable, chain or such (not shown) received in eye 14 suspended such as from a boom, hoist or the like. A cable chain or otherwise (not shown) is received in the shank 20 and is attached to a load being supported. It can be seen that in this attitude it is impossible for the upper pin 40 of second link 28 to become disengaged from body 10.

When it is desired to disconnect the shank from body 10 the shank is moved to the position as shown in FIG. 3, that is, the shank is moved upwardly and laterally in the direction towards second opening 18. In this position, and only in this position, upper pin 40 of link 28 can clear point 46 which is the lower outer end of the opening sidewall 18B. In the attitude of FIG. 3, the link 28 can either be pivoted into the opening 18 or away from it, depending on whether the shank is to be closed or opened relative to the body. When it is open, the shank can be pivoted as wide apart as necessary, such as shown in FIG. 4, to receive any elements to be attached to the becket.

The arrangement wherein the shank 20 must be moved both upwardly and laterally insures a safety inter-relationship between the two which prevents inadvertent openings of the becket. When any weight is on the shank 20 it is securely held in a downward position, that is, it is both moved downwardly and laterally centered under the body and thus is moved in two directions away from the position in which it must occupy before the link 28 can be pivoted towards the open position. To further insure the safety of the becket, leaf spring 42 resiliently engages the upper end of the side plates 32 of link 28. When the link 28 is pivoted outwardly relative to the body 10 when the shank 20 is in the position as shown in FIG. 3, the leaf spring 42 must be slightly upwardly deformed at each end. While leaf spring 42 is not necessary to insure safety of the becket under load conditions, it is helpful in preventing the becket from becoming disengaged if the shank 28 is engaged with the floor or ground surface when in use, that is, it prevents the shank from being inadvertently disconnected from the body 10 under no load conditions.

The invention has been described with the body 10 at the top and shank 20 at the bottom for simplicity. It is understood that the becket functions just as well in the reverse position with the shank at the top.

The apparatus has been described in somewhat particular detail. It can be seen that the actual appearance of the body portion 10, shank 20 and links 26 and 28 may vary considerably from those shown in this illustrated embodiment.

While the invention has been described in detail sufficient to accurately illustrate one embodiment, it is understood that the invention is not so limited, but is to be limited only by the scope of the attached claim or claims, including the full range of equivalency to which each element thereof is entitled.

What is claimed is:

1. An improved hoisting bracket comprising:

an upper body member having an eye in the upper portion for receiving a cable, hook or the like for lifting the bracket, the body having a lower surface and a first opening and a spaced apart second opening, the openings being equidistant from the eye, the second opening being configured as an open top recess in which a horizontal pin may be received therein by downward and lateral movement towards the first opening;

a lower U-shaped shank member having first and second ends in a common plane and having a first opening adjacent the first end and a second opening adjacent the second end, the spacing between the openings in the shank being substantially equal to the spacing between the openings in said body;

first and second links, each having paralleled vertical side plates and paralleled horizontal upper and lower pins, the upper pin of the first link being received in said first body opening and the lower pin in said first shank opening whereby said shank is pivotally attached at the first end to said body and the lower pin of the second link being received in said second shank opening whereby the second link is pivotally supported to the second end of said shank, the upper pin of the second link being slidably positionable into and out of said body second opening when said shank is moved upwardly towards said body and simultaneously laterally in the direction towards said second body opening.

2. An improved hoisting bracket according to claim 1 including spring means affixed to said body adjacent said second opening to resiliently retain said upper pin of said second link in said body second opening.